(12) United States Patent
Miyoshi et al.

(10) Patent No.: US 7,214,328 B2
(45) Date of Patent: May 8, 2007

(54) COMPOSITION FOR ELECTROLYTIC SOLUTION AND PROCESS FOR PRODUCING THE SAME

(75) Inventors: Noritaka Miyoshi, Osaka (JP); Masashi Nakagawa, Osaka (JP); Yasuyuki Yamagawa, Osaka (JP); Kazuhisa Takii, Osaka (JP)

(73) Assignee: Okamura Oil Mill, Ltd., Osaka (JP)

( * ) Notice: Subject to any disclaimer, the term of this patent is extended or adjusted under 35 U.S.C. 154(b) by 539 days.

(21) Appl. No.: 10/497,982

(22) PCT Filed: Dec. 9, 2002

(86) PCT No.: PCT/JP02/12873

§ 371 (c)(1),
(2), (4) Date: Jun. 4, 2004

(87) PCT Pub. No.: WO03/050828

PCT Pub. Date: Jun. 19, 2003

(65) Prior Publication Data

US 2005/0077495 A1   Apr. 14, 2005

(30) Foreign Application Priority Data

Dec. 11, 2001   (JP) ............................. 2001-377318

(51) Int. Cl.
 H01G 9/035   (2006.01)
 H01G 9/02    (2006.01)
 C07C 55/02   (2006.01)
(52) U.S. Cl. .................. 252/62.2; 252/500; 252/182.1; 361/502; 361/503; 361/504; 361/505; 361/506
(58) Field of Classification Search ............... 252/500, 252/62.1, 182.1; 361/502–506
See application file for complete search history.

(56) References Cited

U.S. PATENT DOCUMENTS 4,715,976 A   12/1987   Mori et al.

(Continued)

FOREIGN PATENT DOCUMENTS

JP   57-27013   2/1982

(Continued)

OTHER PUBLICATIONS

International Search Report for PCT/JP02/12873 dated Mar. 18, 2003.

(Continued)

*Primary Examiner*—Douglas McGinty
*Assistant Examiner*—Kallambella Vijayakumar
(74) *Attorney, Agent, or Firm*—Amin, Turocy & Calvin, LLP (57) ABSTRACT

An electrolytic solution for operating electrolytic capacitors which deteriorates extremely little in electrical properties even when used in a high-tension capacitor. The electrolytic solution comprises a compound expressed by general formula (1) below and a compound expressed by general formula (2) below or their salts:

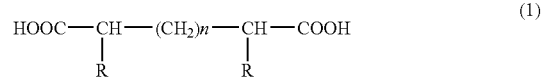

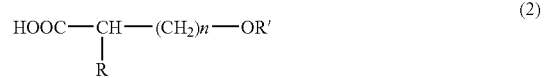

where each R is a same or different alkyl group, and R' is hydrogen, a methyl group or an ethyl group, and n is an integer of 0 to 14.

8 Claims, 2 Drawing Sheets

U.S. PATENT DOCUMENTS 6,258,288 B1 * 7/2001 Miyoshi et al. ............ 252/62.2

FOREIGN PATENT DOCUMENTS

| | | | |
|---|---|---|---|
| JP | 62-7684 | | 2/1987 |
| JP | 62-8005 | | 2/1987 |
| JP | 62-11765 | | 3/1987 |
| JP | 62-254416 | | 12/1987 |
| JP | 63-54209 | | 10/1988 |
| JP | 64-31408 | | 2/1989 |
| JP | 02-298007 | * | 12/1990 |
| JP | 03-074826 | * | 3/1991 |
| JP | 02-277208 | * | 11/1991 |
| JP | 4-186713 | | 7/1992 |
| JP | 04-273421 | | 9/1992 |
| JP | 06-084705 | | 3/1994 |
| JP | 06-275472 | | 9/1994 |
| JP | 06-290998 | * | 10/1994 |
| JP | 6-290998 | | 10/1994 |
| JP | 9-82577 | | 3/1997 |
| JP | 09-082577 | * | 3/1997 |
| JP | 1005053 | * | 5/2000 |
| WO | WO 03/050828 | | 6/2003 |

OTHER PUBLICATIONS

International Preliminary Examination Report, PCT/JP2002/012873, dated Mar. 2, 2004.

* cited by examiner

Figure 1

Figure 2 a) the ratio of 2-butyl-6-ethoxy hexanoic acid with respect to the total amount of 2,7-di-(n-butyl) octane diacid and 2-butyl-6-ethoxy hexanoic acid

COMPOSITION FOR ELECTROLYTIC SOLUTION AND PROCESS FOR PRODUCING THE SAME

TECHNICAL FIELD

The present invention relates to a composition for an electrolytic solution suitable for an electrolytic capacitor, in particular, a medium-to-high voltage electrolytic capacitor and a process for producing the same, and an electrolytic solution for operating an electrolytic capacitor.

BACKGROUND ART

As a conventional electrolytic solution for operating an electrolytic capacitor, in particular, as an electrolytic solution for a medium-to-high voltage electrolytic capacitor, solutions obtained by adding boric acid or ammonium pentaborate serving as an electrolyte to a solution comprising ethylene glycol as a main component have been used. In an electrolytic solution containing boric acid, the boric acid is reacted with ethylene glycol so that a large amount of water is produced by condensation, which results in increasing water content in the electrolytic solution system. Therefore, when an electrolytic solution containing boric acid is used at a temperature of more than 100° C., the water in the electrolytic solution is evaporated to form a water vapor. Thus, the internal pressure in the package of the electrolytic capacitor is increased, and the electrolytic capacitor tends to be damaged. In order to overcome such a disadvantage, an electrolytic solution containing linear saturated dibasic acid or a salt thereof has come to be used.

However, since the solubility of linear saturated dibasic acid with respect to a solvent such as ethylene glycol is low, the linear saturated dibasic acid tends to be precipitated in the form of crystals at a low temperature, and therefore the problems that overcurrent is generated, and the low temperature characteristics of the capacitor deteriorate cannot be avoided.

Therefore, in recent years, it is attempted to use branched saturated or unsaturated dibasic acids, for example, dibasic acids such as 7-methyl-tetradecane-1,14-dicarboxylic acid, 7,12-dimethyl-octadecane-1,18-dicarboxylic acid, 7,12-dimethyl-7,11-octadecadiene-1,18-dicarboxylic acid, 7-methyl-7-tetradecene-1,14-dicarboxylic acid (Japanese Laid-Open Patent Publication No. 57-27013, Japanese Patent Publication Nos. 63-54209, 62-11765, 62-8005, and 62-7684, Japanese Laid-Open Patent Publication Nos. 62-254416, and 64-31408), 7-vinyl-9-hexadecene-1,16-dicarboxylic acid (Japanese Laid-Open Patent Publication No. 4-186713) and their salts as a solute.

The solubility of such branched unsaturated dibasic acids or their salts in a solvent such as ethylene glycol has been improved from that of linear saturated dibasic acids as described above or their salts. Therefore, the branched unsaturated dibasic acids or their salts are useful as a solute of an electrolytic solution. In particular, a dibasic acid of 7-vinyl-9-hexadecene-1,16-dicaroboxylic acid or its salt is useful as a solute of a specific electrolytic solution having electrical characteristics having a high breakdown voltage that exceeds a medium voltage region. This seems to be because the vinyl group in position 7 has a high ability of forming a complex with an aluminum electrode foil.

However, when the branched unsaturated dibasic acids as described above or their salts are used as a solute of an electrolytic solution for a high voltage capacitor, the electric conductivity (mS/cm) or the sparking threshold voltage (Vsp) of the electrolytic solution is reduced in use over a long time, and the water content tends to be increased. Therefore, the performance as a high voltage capacitor is not always adequate.

Therefore, there is a demand for a composition for an electrolytic capacitor that can be used for a high voltage capacitor, does not allow the electric conductivity (mS/cm) or the sparking threshold voltage (Vsp) of the electrolytic solution to be reduced in a long time use and prevents the water content from increasing, in particular, a composition for a high voltage electrolytic capacitor.

DISCLOSURE OF INVENTION

The present invention provides a composition for an electrolytic solution comprising a compound expressed by general formula (1) below and a compound expressed by general formula (2) below or their salts:

where each R is a same or different alkyl group, and R' is hydrogen, a methyl group or an ethyl group, and n is an integer of 0 to 14.

In a preferable embodiment, R is a methyl group, an ethyl group, a propyl group or a butyl group, and n is 2 to 10.

The present invention also provides an electrolytic solution for operating an electrolytic capacitor containing the composition for an electrolytic solution.

Furthermore, the present invention provides a process for producing a mixture comprising a compound expressed by general formula (1) below and a compound expressed by general formula (2) below or their salts:

where each R is a same or different alkyl group, and R' is hydrogen, a methyl group or an ethyl group, and n is an integer of 0 to 14, comprising:

(i) step of obtaining a diester of alkylated malonic acid by reacting a diester of malonic acid with alkylhalide in the presence of a base;

(ii) step of obtaining Mixture (I) containing a compound expressed by general formula (A1) below and a compound expressed by general formula (A2) below by reacting the diester of alkylated malonic acid with a dihaloalkane in the presence of a base:

-continued where R and R" is each independently an alkyl group, and R' is hydrogen, a methyl group or an ethyl group, and n is an integer of 0 to 14;

(iii) step of obtaining Mixture (II) containing a compound expressed by general formula (B1) below and a compound expressed by general formula (B2) below by subjecting Mixture (I) to saponification and acidolysis:

where each R is a same or different alkyl group, and R' is hydrogen, a methyl group or an ethyl group, and n is an integer of 0 to 14; and (iv) step of collecting Mixture (III) containing the compound expressed by general formula (1) and the compound expressed by general formula (2) by subjecting Mixture (II) to decarbonation.

In a preferable embodiment, the base in each of step (i) and step (ii) is selected from the group consisting of pyridine, n-methyl pyrrolidine, metalalkoxide, potassium carbonate, and sodium carbonate.

In a preferable embodiment, R is a methyl group, an ethyl group, a propyl group or a butyl group, and n is 2 to 10.

BEST MODE FOR CARRYING OUT THE INVENTION (Composition for Electrolytic Solution)

A composition for an electrolytic solution of the present invention comprises a compound expressed by general formula (1) below and a compound expressed by general formula (2) below or their salts.

The compound expressed by the formula (1) (this compound may be referred to as "compound (1)" in this specification) is a dibasic acid, and has an alkyl group at the carbon atom of α position of each of two carboxylic acids. The compound expressed by the formula (2) (this compound may be referred to as "compound (2)" in this specification) also has an alkyl group in the carbon atom of α position of a carboxylic acid.

In the general formulae above, R is an alkyl group, and may be the same or different. There is no particular limitation regarding the alkyl group. The alkyl group may be branched. Among alkyl groups, lower alkyl groups having 1 to 7 carbon atoms are preferable, and alkyl groups having 1 to 5 carbon atoms are more preferable. Among these, linear alkyl groups having 1 to 4 carbon atoms (methyl group, ethyl group, propyl group butyl group, etc.) are even more preferable. R' is hydrogen, a methyl group, or an ethyl group.

n in the general formulae above is each independently an integer of 0 to 14, and preferably n is 1 to 12, and more preferably 2 to 10.

As a salt of the compound (1) and the compound (2), ammonium or amine salts thereof can be used preferably.

It is preferable that the composition for an electrolytic solution contains the compound (1) (dibasic acid) or a salt thereof and the compound (2) or a salt thereof in a mole ratio of 100:0 to 55:45, more preferably, 90:10 to 55:45, even more preferably, 80:20 to 55:45, and particularly preferably, 80:20 to 75:25.

The composition for an electrolytic solution of the present invention may contain a dibasic acid other than the above that conventionally has been used as a solute for an electrolytic solution in an amount that does not inhibit the characteristics of the composition for an electrolytic solution of the present invention. For example, a dibasic acid such as alkyl malonic acid may be contained.

(Process for Producing a Mixture Containing Compound (1) and Compound (2))

It is possible to produce separately each of the compound (1) and the compound (2) that are the main components of the composition for an electrolytic solution of the present invention with any suitable process. However, a mixture containing both of these components can be produced preferably by the process including steps (i) to (iv) below, and it is convenient to use this process.

(i) step of obtaining a diester of alkylated malonic acid (A0) by reacting a diester of malonic acid with an alkylhalide in the presence of a base;

(ii) step of obtaining Mixture (I) containing a compound expressed by general formula (A1) and a compound expressed by general formula (A2) (described later) by reacting the diester of alkylated malonic acid obtained in the step (i) with dihaloalkane in the presence of a base;

(iii) step of obtaining Mixture (II) containing a compound expressed by general formula (B1) and a compound expressed by general formula (B2) (described later) by subjecting Mixture (I) to saponification and acidolysis; and (iv) step of obtaining Mixture (III) containing the compound (1) and the compound (2) by subjecting Mixture (II) to decarbonation.

Figure 1:
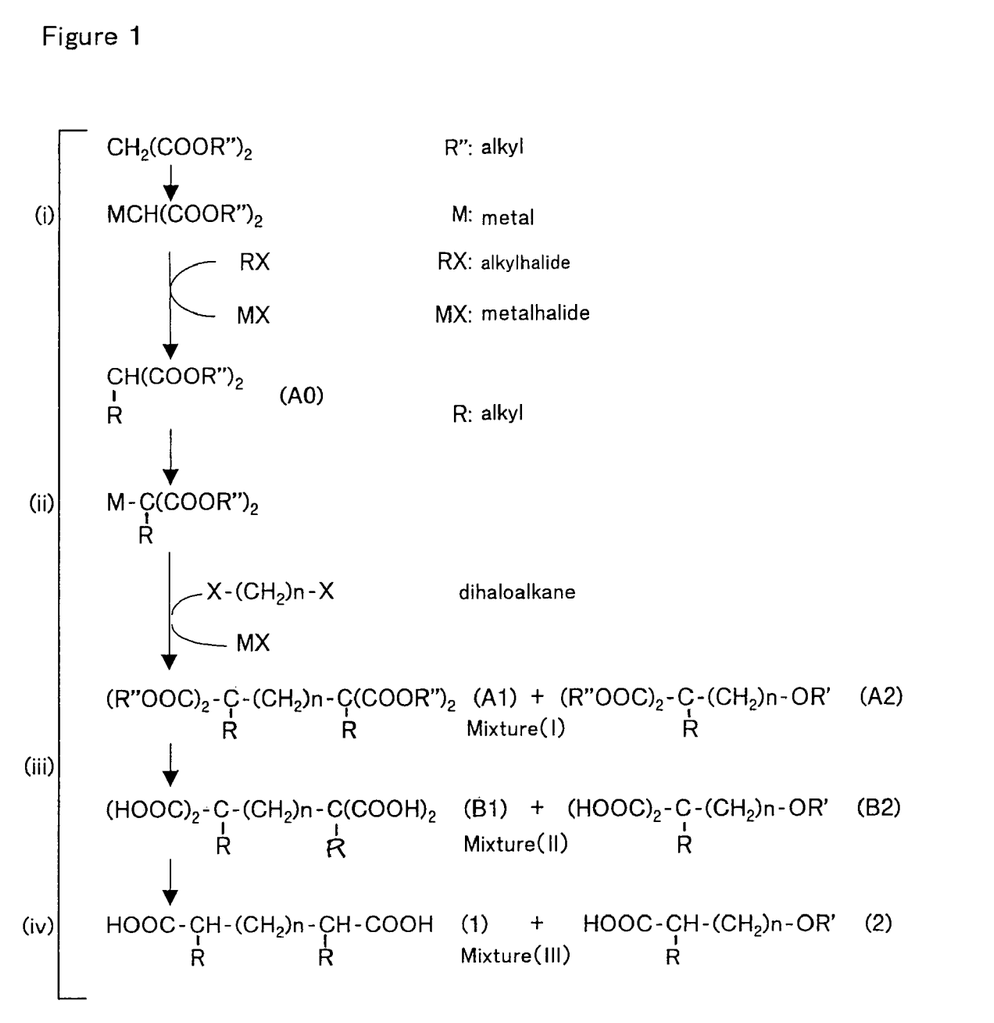
FIG. 1 is a process diagram showing an example of a process for producing a mixed solution containing main components of an electrolytic composition of the present invention.

The above-described process will be described more specifically with reference to FIG. 1. FIG. 1 shows a case where metalalkoxide, potassium carbonate or sodium carbonate is used as the base.

First, in the step (i), a diester of alkylated malonic acid (A0):

(A0)

(where R and R" are each independently an alkyl group) is obtained by reacting a diester of malonic acid with an alkylhalide (RX) in the presence of a base (metalalkoxide or potassium carbonate). R" is preferably a methyl group or an ethyl group.

The step (i) includes the following processes, for example. Using an alcohol as a solvent, metallic sodium, sodium hydride or potassium carbonate is slowly added to the solvent, so that a base (e.g., sodium alkoxide or potassium alkoxide) is produced; a diester of malonic acid is dripped to this solution; then, alkylhalide is dripped; the mixture is refluxed; resultant alkylhalide (sodium halide) is filtered off, and then an excess amount of aqueous solution saturated with an ammonium chloride is poured to the reaction liquid so as to separate it into an organic layer and a water layer; then, the organic layer is washed with water, and by super-fractionation, unreacted diester of malonic acid is separated from a diester of alkylated malonic acid (A0); and the diester of alkylated malonic acid (A0) is isolated.

As the base, metalalkoxide, pyridine, n-methyl pyrrolidine, potassium carbonate, and sodium carbonate can be used preferably. Among these, metalalkoxide is preferable. As metalalkoxide, sodium alkoxide produced from metallic sodium or sodium hydride and an alcohol is preferably used. Examples thereof include sodium ethoxide and sodium methoxide.

As alkylhalide, for example, alkyl chloride (propyl chloride, butyl chloride, etc), methyl iodide and ethyl bromide can be used. The alkyl group of this alkylhalide corresponds to R of the compound (1) and the compound (2) above.

The metalalkoxide is reacted in an amount of, preferably 1.0 to 1.2 mols, and more preferably 1.1 mols, with respect to one mol of the diester of malonic acid. The alkylhalide is reacted in an amount of, preferably 0.5 to 0.8 mols, and more preferably 0.67 mols, with respect to one mol of the diester of malonic acid.

In this step (i), when one kind of alkylhalide is used, the alkyl groups R of the compounds expressed by the general formulae (1) and (2) are the same. When a combination of two or more kinds of alkylhalide having different alkyl groups is used, the alkyl groups R of the compounds expressed by the general formulae (1) and (2) can be different.

In the step (ii), Mixture (I) containing a compound expressed by the general formula (A1) below and a compound expressed by the general formula (A2) below is obtained by reacting the diester of alkylated malonic acid (A0) obtained in the step (i) with dihaloalkane in the presence of a base:

(A1)

(A2)

(where R and R" are each independently an alkyl group, and R' is hydrogen, a methyl group, or an ethyl group, and n is an integer of 0 to 14).

The base and the metalalkoxide used in this step (ii), the same base and metalalkoxide as those in the step (i) can be used.

The step (ii) includes the following processes, for example. Using an alcohol as a solvent, metal sodium or sodium hydride is slowly added thereto, so that sodium alkoxide is produced; a diester of alkylated malonic acid (A0) is dripped thereto; then, dihaloalkane (e.g., 1,ω-dichloroalkane) is dripped; the mixture is refluxed; after the reaction is completed, halogenated sodium is filtrated off, and then an excessive amount of aqueous solution saturated with an ammonium chloride is poured to the reaction liquid so as to separate it into an organic layer and a water; then, the organic layer is washed with water, and the organic layer is subjected to superfractionation so that unreacted dihaloalkane and the diester of alkylated malonic acid (A0) are separated from Mixture (I) of the compound expressed by general formula (A1) and the compound expressed by general formula (A2) can be obtained, and the mixture is collected.

The metalalkoxide is reacted in an amount of,-preferably 0.9 to 1.1 mols, and more preferably 1.0 mols, with respect to one mol of the diester of alkylated malonic acid (A0). The dihaloalkane is reacted in an amount of, preferably 0.45 to 0.55 mols, and more preferably 0.5 mols, with respect to one mol of the diester of alkylated malonic acid (A0).

By using a combination two or more dihaloalkanes in the step (ii), a compound that is expressed by general formula (1) but has a different number as n and a compound that is expressed by general formula (2) but has a different number as n can be produced.

In the step (iii), Mixture (II) containing a compound expressed by general formula (B1) below and a compound expressed by general formula (B2) below is obtained by subjecting Mixture (I) to saponification and acidolysis:

(B1)

(B2)

(where R is each independently an alkyl group, and R' is hydrogen, a methyl group, or an ethyl group, and n is an integer of 0 to 14).

The saponification and acidolysis can be performed by a method used by those skilled in the art as appropriate. For example, a saponification reaction can be performed by dripping an alkaline aqueous solution (e.g., sodium hydroxide solution) to Mixture (I). After the saponification reaction is completed, the mixture was turned to be acidic with, for example, sulfuric acid, and then washing with water is repeated so that Mixture (II) containing compounds expressed by general formulae (B1) and (B2) can be obtained.

In the step (iv), Mixture (III) containing the compound (1) and the compound (2) is obtained by subjecting Mixture (II) to decarbonation:

(where R is an alkyl group, and R' is hydrogen, a methyl group, or an ethyl group, and n is an integer of 0 to 14).

In the step (iv), for example, first, Mixture (II) is dissolved in a suitable solvent (e.g., acetonitrile). A catalyst (e.g., copper oxide) is added to the solution, and an inert gas (e.g., argon gas) is blown into the solution so as to remove air. Then, the mixture is heated and refluxed so that decarbonation proceeds and thus a mixture containing the compound (1) and the compound (2) can be obtained.

The thus produced compound (1) and the compound (2) are made into a desired salt in accordance with necessity. For example, they are made into salts of ammonium, amine or the like, and, in particular, ammonium salts can be used preferably. The salts of the above compounds can be produced in the following manner, for example: the compound (1) and the compound (2) serving as solutes are dissolved in a solvent (e.g., ethylene glycol, γ-butyrolactone, methyl cellosolve, or a mixture thereof); ammonia, amine or the like is supplied to this solution; the supply of ammonia or amine is stopped when the pH of the solution has reached 6 to 8, preferably about 6.5 to about 7.5. The concentration of the solute is, for example, about 3 to 60% by weight (hereinafter wt %), preferably about 5 to 40 wt % and more preferably about 20 wt %.

(Electrolytic Solution for Operating Electrolytic Capacitor)

The electrolytic solution for operating an electrolytic capacitor of the present invention contains the compound (1) and the compound (2) or their salts. More specifically, this electrolytic solution contains the compound (1) and the compound (2) or their salts as solutes in a suitable solvent. As the solvent, acetonitrile, ethylene glycol, y-butyrolactone, methyl cellosolve, and the like can be used. These compounds generally are contained in a total amount of 0.5 to 40 wt %, preferably 1 to 25 wt %, more preferably 2 to 20 wt %, and even more preferably 5 to 12 wt %. It is preferable that the electrolytic solution for operating an electrolytic capacitor contains the compound (1) or its salt and the compound (2) or its salt in a mole ratio of 100:0 to 55:45, more preferably 90:10 to 55:45, and even more preferably 80:20 to 55:45, and particularly more preferably 80:20 to 75:25 in order to exhibit an excellent function as an electrolytic solution.

The electrolytic solution of the present invention is prepared by dissolving the compound (1) and the compound (2) or their salts in a solvent. Further, the mixture obtained by the process including the above-described steps (i) to (iv) can be utilized as an electrolytic solution as it is.

An additive that can be added to a conventional electrolytic solution by those skilled in the art can be added to the electrolytic solution for operating an electrolytic capacitor of the present invention in an amount that does not impair its function. Examples of such an additive include oxy-acids (such as malic acid, citric acid, glycolic acid, lactic acid, tartronic acid, and salicylic acid), 8-oxyquinoline, and ethylene diamine tetraacetic acid (EDTA).

The electrolytic solution for operating an electrolytic capacitor of the present invention may contain a dibasic acid other than the compound (1) and the compound (2) that conventionally has been used as a solute in an amount that does not impair the characteristics of the electrolytic solution for operating an electrolytic capacitor of the present invention.

The thus obtained electrolytic solution for operating an electrolytic capacitor of the present invention exhibits excellent characteristics in a wide temperature range. That is to say, an electrolytic solution for operating an electrolytic capacitor in which there is little precipitation at a low temperature, and that can be used at a rated voltage of 500 W and has a large industrial and practical value can be provided.

EXAMPLES

The present invention will be described more specifically by way of example, but the present invention is not limited to these examples.

Example 1

(Preparation of a Diester of Alkylated Malonic Acid)

Metallic sodium (2 mols:46 g) was gradually added to 2 L of ethanol to produce sodium ethoxide (EtONa), and diethyl malonate (3 mols 480 g) was dripped thereto. After the dripping is completed, methyl iodide (2 mols, 284 g) was dripped as alkylhalide. After the dripping is completed, the reaction was allowed to continue under reflux for one hour. The reaction liquid was poured to an excess amount (1 L) of an aqueous solution saturated with ammonium chloride, and separated into an organic layer and a water layer. The organic layer was collected, and washed with water. The obtained organic layer was subjected to superfractionation so as to separate unreacted diethyl malonate from diethyl methylmalonate, and thus the diethyl methylmalonate was isolated.

In the same manner, a reaction was performed under the same conditions as above, using ethyl bromide (2 mols, 218 g), propyl chloride (2 mols, 157 g) and butyl chloride (2 mols, 185 g). Table 1 shows the yield and the properties of the thus obtained diethyl alkylated malonates (diethyl methylmalonate, diethyl ethylmalonate, diethyl n-propylmalonate, and diethyl n-butylmalonate).

TABLE 1

| Name of compound | bp/mmHg | molar yield | $^1$H-NMR CDCl$_3$ standard: TMS |
|---|---|---|---|
| diethyl methylmalonate CH$_3$—CH(COOC$_2$H$_5$)$_2$ | 60.0–60.4° C./ 3 mmHg | 94.1% | δ 0.95(d, J = 8.2 Hz, 3H), 1.28(t, J = 8.7 6H), Hz, 3.30(q, J = 8.2 Hz, 1H), 4.21(q, J = 8.7 Hz, 4H) |
| diethyl ethylmalonate C$_2$H$_5$—CH(COOC$_2$H$_5$)$_2$ | 68.2–70.0° C./ 3 mmHg | 91.0% | δ 0.98(t, J = 8.2 Hz, 3H), 1.28(t, J = 8.7 Hz, 6H), 1.92(d-q, J = 8.2 and 8.2 Hz, 2H), 3.25(t, J = 8.2 Hz, 1H), 4.21(q, J = 8.2 Hz, 4H) |
| diethyl n-propylmalonate C$_3$H$_7$—CH(COOC$_2$H$_5$)$_2$ | 75.2–80.1° C./ 3 mmHg | 86.3% | δ 0.94(t, J = 8.2 Hz, 3H), 1.28(t, J = 8.7 Hz, 6H, 1.36(t-q, J = 8.2 and 8.2 Hz, 2H), 1.88(t-d, J = 8.2 and 8.2 Hz, 2H), 3.35(t, J = 8.2 Hz, 2H), 4.20(q, J = 8.7 Hz, 4H) |
| diethyl n-butylmalonate C$_4$H$_9$—CH(COOC$_2$H$_5$)$_2$ | 79.0–82.1° C./ 2 mmHg | 81.6% | δ 0.90(t, J = 8.2 Hz, 3H), 1.30(t, J = 8.7 Hz, 6H, 1.30–1.42(c, 4H), 1.90(t-d, J = 8.2 and 8.2 Hz, 2H), 3.25(t, J = 8.2 Hz, 1H), 4.20(q, J = 8.7 Hz, 4H) |

(Preparation of Mixture (I))

Mixture (I) was prepared using the above obtained diethyl n-butylmalonate in the following manner. First, metallic sodium (1 mol:23 g) was slowly added to 1 L of ethanol to produce EtONa, and diethyl n-butylmalonate (1 mol: 216 g) was dripped thereto. After the dripping is completed, 1,4-dichlorobutane (0.4 mols: 50.8 g) was dripped as dihaloalkane. The temperature of the reaction liquid was gradually increased to the reflux temperature of ethanol and the reflux was allowed to continue for four hours. The precipitated sodium chloride was filtrated off, and then the reaction liquid was poured to an excess amount (1 L) of an aqueous solution saturated with ammonium chloride, and separated into an organic layer and a water layer. The organic layer was collected, and washed with water. The obtained organic layer was subjected to superfractionation so that unreacted diethyl butylmalonate and 1,4-dichlorobutane were separated from the mixture. Thus a mixture (expressed by E4-4 in Table 2, which corresponds to Mixture (I) ) was obtained. The mixture contains a compound expressed by general formula (A1) where R has 4 carbon atoms and n is 4 (a compound expressed by (A1) of E4-4 in Table 2 below) in an amount of 147 g (0.30 mols) and a compound expressed by general formula (A2) where R has 4 carbon atoms and n is 4 (a compound expressed by (A2) of E4-4 in Table 2 below) in an amount of 22 g (0.07 mols). The yield of the compound (A1) and the compound (A2) contained in the mixture (E4-4) was 92.5% in total when calculated based on the amount of 1,4-dichlorobutane used in the reaction. The acid value of the mixture (E4-4) was 1.2 KOHmg/g, and the saponification value was 456 KOHmg/g as its actually measured value (calculated value: 461 KOHmg/g).

Separately from this, various Mixtures (I) were obtained, using diethyl alkylated malonate other than diethyl n-butylmalonate as above, by reacting it with various dihaloalkane under the reaction conditions as above. Table 2 shows the compositions of the obtained mixtures. In Table 2, each mixture is shown by Er-n with symbolized r, which is the carbon number of the alkyl group R, and n, which is the number of the methylene group of the compound (A1) and the compound (A2) contained in the mixture. For example, the carbon number r of alkyl group R of the compound (A1) and the compound (A2) contained in the above Mixture (I) obtained from diethyl n-butylmalonate and 1,4-dichlorobutane is 4, and n is 4, and therefore Mixture (I) is shown by "E4-4". The yield in Table 2 is based on the amount of dihaloalkane.

TABLE 2

| mixture No. Er—n | Mixture(I) | | (A1):(A2) molar ratio | molar yield(%) |
|---|---|---|---|---|
| | compound (A1) | compound (A2) | | |
| E1-4 | (EtOOC)$_2$C—(CH$_2$)$_4$—C(COOEt)$_2$<br>         \|               \|<br>         CH$_3$          CH$_3$ | (EtOOC)$_2$C—(CH$_2$)$_4$—OEt<br>         \|<br>        CH$_3$ | 85:15 | 88.7 |
| E2-4 | (EtOOC)$_2$C—(CH$_2$)$_4$—C(COOEt)$_2$<br>         \|               \|<br>        C$_2$H$_5$        C$_2$H$_5$ | (EtOOC)$_2$C—(CH$_2$)$_4$—OEt<br>         \|<br>       C$_2$H$_5$ | 84:16 | 81.9 |
| E3-4 | (EtOOC)$_2$C—(CH$_2$)$_4$—C(COOEt)$_2$<br>         \|               \|<br>        C$_3$H$_7$        C$_3$H$_7$ | (EtOOC)$_2$C—(CH$_2$)$_4$—OEt<br>         \|<br>       C$_3$H$_7$ | 82:18 | 86.2 |
| E4-4 | (EtOOC)$_2$C—(CH$_2$)$_4$—C(COOEt)$_2$<br>         \|               \|<br>        C$_4$H$_9$        C$_4$H$_9$ | (EtOOC)$_2$C—(CH$_2$)$_4$—OEt<br>         \|<br>       C$_4$H$_9$ | 81:19 | 92.5 |

TABLE 2-continued

| mixture No. Er—n | Mixture(I) compound (A1) | | compound (A2) | (A1):(A2) molar ratio | molar yield(%) |
|---|---|---|---|---|---|
| E4-1 | $(EtOOC)_2C\!-\!CH_2\!-\!C(COOEt)_2$ <br> $\quad\;\; \mid \qquad\qquad \mid$ <br> $\quad\;\; C_4H_9 \qquad\quad\; C_4H_9$ | | $(EtOOC)_2C\!-\!CH_2\!-\!OEt$ <br> $\quad\;\; \mid$ <br> $\quad\;\; C_4H_9$ | 80:20 | 91.2 |
| E4-2 | $(EtOOC)_2C\!-\!(CH_2)_2\!-\!C(COOEt)_2$ <br> $\quad\;\; \mid \qquad\qquad\quad\;\; \mid$ <br> $\quad\;\; C_4H_9 \qquad\qquad\;\; C_4H_9$ | | $(EtOOC)_2C\!-\!(CH_2)_2\!-\!OEt$ <br> $\quad\;\; \mid$ <br> $\quad\;\; C_4H_9$ | 81:19 | 89.1 |
| E4-6 | $(EtOOC)_2C\!-\!(CH_2)_6\!-\!C(COOEt)_2$ <br> $\quad\;\; \mid \qquad\qquad\quad\;\; \mid$ <br> $\quad\;\; C_4H_9 \qquad\qquad\;\; C_4H_9$ | | $(EtOOC)_2C\!-\!(CH_2)_6\!-\!OEt$ <br> $\quad\;\; \mid$ <br> $\quad\;\; C_4H_9$ | 79:21 | 87.7 |
| E4-8 | $(EtOOC)_2C\!-\!(CH_2)_8\!-\!C(COOEt)_2$ <br> $\quad\;\; \mid \qquad\qquad\quad\;\; \mid$ <br> $\quad\;\; C_4H_9 \qquad\qquad\;\; C_4H_9$ | | $(EtOOC)_2C\!-\!(CH_2)_8\!-\!OEt$ <br> $\quad\;\; \mid$ <br> $\quad\;\; C_4H_9$ | 78:22 | 84.4 |
| E4-10 | $(EtOOC)_2C\!-\!(CH_2)_{10}\!-\!C(COOEt)_2$ <br> $\quad\;\; \mid \qquad\qquad\quad\;\;\; \mid$ <br> $\quad\;\; C_4H_9 \qquad\qquad\;\; C_4H_9$ | | $(EtOOC)_2C\!-\!(CH_2)_{10}\!-\!OEt$ <br> $\quad\;\; \mid$ <br> $\quad\;\; C_4H_9$ | 79:21 | 81.2 |

(Preparation of Mixture (II))

Next, the mixture E4-4 was subjected to saponification and acidolysis in the following manner. First, 500 mL of water was put in a 2 L flask, and E4-4 (146 g) was added thereto, and a 48% NaOH solution (120 g) was dripped at 100° C. while stirring. After the dripping was completed, the reaction was allowed to continue for further four hours while the temperature as above was maintained. Then, the reaction mixture was turned to be acidic with sulfuric acid, washing with water was repeated, and thus a mixture (expressed by AA4-4 in Table 3 and corresponding to Mixture (II)). The mixture contains a compound expressed by general formula (B1) where R has 4 carbon atoms and n is 4 (a compound expressed by (B1) of AA4-4 in Table 3 below) and a compound expressed by general formula (B2) where R has 4 carbon atoms and n is 4 (a compound expressed by (B2) of AA4-4 in Table 3 below) in a total amount of 95.7 g (0.26 mols) was obtained. The yield of the compound (B1) and the compound (B2) contained in this mixture (AA4-4) was 80 mol % based on the total amount of the compound expressed by (A1) and the compound expressed by (A2) of E4-4. The acid value of the mixture (AA4-4) was 587 KOHmg/g as its actually measured value (calculated value: 596 KOHmg/g).

Various Mixtures (II) were obtained by reacting other Mixtures (I) other than E4-4 shown in Table 2 in the same manner. Table 3 shows the compositions of the obtained mixtures. In Table 3, each mixture is shown by AAr-n with symbolized r, which is the carbon number of the alkyl group R, and n, which is the number of the methylene group of the compound (B1) and the compound (B2) contained in the mixture. For example, the carbon number r of alkyl group R of the compound (B1) and the compound (B2) contained in the above Mixture (II) obtained from the mixture (E4-4) is 4, and n is 4, and therefore Mixture (II) is shown by "AA4-4".

TABLE 3

| mixture No. AAr-n | Mixture(II) compound(B1) | compound(B2) | molar yield(%) |
|---|---|---|---|
| AA1-4 | $(HOOC)_2C\!-\!(CH_2)_4\!-\!C(COOH)_2$ <br> $\quad\;\; \mid \qquad\qquad\quad\;\; \mid$ <br> $\quad\;\; CH_3 \qquad\qquad\;\; CH_3$ | $(HOOC)_2C\!-\!(CH_2)_4\!-\!OEt$ <br> $\quad\;\; \mid$ <br> $\quad\;\; CH_3$ | 81.5 |
| AA2-4 | $(HOOC)_2C\!-\!(CH_2)_4\!-\!C(COOH)_2$ <br> $\quad\;\; \mid \qquad\qquad\quad\;\; \mid$ <br> $\quad\;\; C_2H_5 \qquad\qquad\;\; C_2H_5$ | $(HOOC)_2C\!-\!(CH_2)_4\!-\!OEt$ <br> $\quad\;\; \mid$ <br> $\quad\;\; C_2H_5$ | 82.4 |
| AA3-4 | $(HOOC)_2C\!-\!(CH_2)_4\!-\!C(COOH)_2$ <br> $\quad\;\; \mid \qquad\qquad\quad\;\; \mid$ <br> $\quad\;\; C_3H_7 \qquad\qquad\;\; C_3H_7$ | $(HOOC)_2C\!-\!(CH_2)_4\!-\!OEt$ <br> $\quad\;\; \mid$ <br> $\quad\;\; C_3H_7$ | 85.3 |
| AA4-4 | $(HOOC)_2C\!-\!(CH_2)_4\!-\!C(COOH)_2$ <br> $\quad\;\; \mid \qquad\qquad\quad\;\; \mid$ <br> $\quad\;\; C_4H_9 \qquad\qquad\;\; C_4H_9$ | $(HOOC)_2C\!-\!(CH_2)_4\!-\!OEt$ <br> $\quad\;\; \mid$ <br> $\quad\;\; C_4H_9$ | 80.0 |

TABLE 3-continued

| mixture No. AAr-n | Mixture(II) compound(B1) | compound(B2) | molar yield(%) |
|---|---|---|---|
| AA4-1 | $(HOOC)_2C-CH_2-C(COOH)_2$ <br> $\quad\ \ \ \ |\qquad\qquad\qquad\ |$ <br> $\quad\ \ C_4H_9\qquad\qquad\ \ C_4H_9$ | $(HOOC)_2C-CH_2-OEt$ <br> $\quad\ \ \ \ |$ <br> $\quad\ \ C_4H_9$ | 84.2 |
| AA4-2 | $(HOOC)_2C-(CH_2)_2-C(COOH)_2$ <br> $\quad\ \ \ \ |\qquad\qquad\qquad\ \ \ |$ <br> $\quad\ \ C_4H_9\qquad\qquad\qquad\ C_4H_9$ | $(HOOC)_2C-(CH_2)_2-OEt$ <br> $\quad\ \ \ \ |$ <br> $\quad\ \ C_4H_9$ | 83.0 |
| AA4-6 | $(HOOC)_2C-(CH_2)_6-C(COOH)_2$ <br> $\quad\ \ \ \ |\qquad\qquad\qquad\ \ \ |$ <br> $\quad\ \ C_4H_9\qquad\qquad\qquad\ C_4H_9$ | $(HOOC)_2C-(CH_2)_6-OEt$ <br> $\quad\ \ \ \ |$ <br> $\quad\ \ C_4H_9$ | 82.9 |
| AA4-8 | $(HOOC)_2C-(CH_2)_8-C(COOH)_2$ <br> $\quad\ \ \ \ |\qquad\qquad\qquad\ \ \ |$ <br> $\quad\ \ C_4H_9\qquad\qquad\qquad\ C_4H_9$ | $(HOOC)_2C-(CH_2)_8-OEt$ <br> $\quad\ \ \ \ |$ <br> $\quad\ \ C_4H_9$ | 83.3 |
| AA4-10 | $(HOOC)_2C-(CH_2)_{10}-C(COOH)_2$ <br> $\quad\ \ \ \ |\qquad\qquad\qquad\quad\ |$ <br> $\quad\ \ C_4H_9\qquad\qquad\qquad\quad C_4H_9$ | $(HOOC)_2C-(CH_2)_{10}-OEt$ <br> $\quad\ \ \ \ |$ <br> $\quad\ \ C_4H_9$ | 84.9 |

(Preparation of Mixture (III))

Next, the mixture AA4-4 was subjected to decarbonation in the following manner. First, AA4-4 (83 g) was dissolved in 100 ml of acetonitrile, and this was added to 500 mL of water in a 2 L flask. Then, 0.01 mols (1 g) of copper oxide (I) was added thereto, and the container was purged with argon gas while gradually increasing the temperature. After purge with argon gas, the reaction was allowed to continue for six hours under acetonitrile reflux. After it was confirmed that generation of carbon acid gas has been stopped, the reaction liquid was poured to 50 ml of 3N hydrochloric acid, and the organic layer was collected, and then washing with water was repeated. The organic layer was dried so that the solvent is removed. Thus, a mixture (expressed by A4-4 in Table 4 and corresponding to Mixture (III)) containing a compound expressed by general formula (1) where R has 4 carbon atoms and n is 4 (a compound expressed by (1) of A4-4 in Table 4 below) and a compound expressed by general formula (2) where R has 4 carbon atoms and n is 4 (a compound expressed by (2) of A4-4 in Table 4 below) was obtained in an amount of 57.2 g. The yield of the compound (1) and the compound (2) contained in this mixture (A4-4) was 90.9 mol % based on the total amount of the compound expressed by (B1) and the compound expressed by (B2) of AA4-4. The acid value of the mixture (A4-4) was 383 KOHmg/g as its actually measured value (calculated value: 392 KOHmg/g).

The compound (1) and the compound (2) contained in the mixture A4-4 are methylesterified and purified by distillation, and then the structure of the obtained compound was determined.

The spectrum of a methyl esterified product of the compound (1) contained in the mixture A4-4 was as follows:

$^1$H-NMR(CDCl$_3$): δ 0.87 (t), 1.2–1.4 (c), 1.4–1.55 (c), 2.31 (t-t), 3.78 (s)

$^{13}$C-NMR(CDCl$_3$): δ 14.0, 23.1, 27.5, 29.7, 29.8, 30.1, 42.2, 50.7, 176.0

As a result, it was confirmed that this product was dimethyl-2,7-di-(n-butyl)octanedioic acid, and the compound (1) was 2,7-di-(n-butyl)octanedioic acid.

On the other hand, the spectrum of a methyl esterified product of the compound (2) contained in the mixture A4-4 was as follows:

$^1$H-NMR(CDCl$_3$): δ 0.96 (t), 1.11 (t), 1.2–1.7 (m-c), 3.41 (q), 3.37 (t), 3.67 (s)

$^{13}$C-NMR(CDCl$_3$): δ 14.0, 14.7, 23.1, 23.8, 29.7, 30.1, 31.0, 50.7, 63.0, 69.9, 176.0

As a result, it was confirmed that this product was methyl-2-butyl-6-ethoxyhexanoic acid, and the compound (2) was 2-butyl-6-ethoxyhexanoic acid.

Various Mixtures (III) were obtained by reacting other Mixtures (II) other than AA4-4 shown in Table 3 in the same manner. Table 4 shows the compositions of the obtained mixtures. In Table 4, each mixture is shown by Ar-n with symbolized r, which is the carbon number of the alkyl group R, and n, which is the number of the methylene group of the compound (1) and the compound (2) contained in the mixture. For example, the carbon number r of alkyl group R of the compound (1) and the compound (2) contained in the above Mixture (III) obtained from the mixture (AA4-4) is 4, and n is 4, and therefore Mixture (III) is shown by "A4-4".

TABLE 4

| mixture No. Ar-n | Mixture(III) compound(1) | compound (2) | molar yield(%) |
|---|---|---|---|
| A1-4 | 2,7-dimethyloctanedioic acid<br>HOOC—CH(CH$_3$)—(CH$_2$)$_4$—CH(CH$_3$)—COOH | 2-methyl-6-ethoxyhexanoic acid<br>HOOC—CH(CH$_3$)—(CH$_2$)$_4$—OEt | 86.6 |
| A2-4 | 2,7-diethyloctanedioic acid<br>HOOC—CH(C$_2$H$_5$)—(CH$_2$)$_4$—CH(C$_2$H$_5$)—COOH | 2-ethyl-6-ethoxyhexanoic acid<br>HOOC—CH(C$_2$H$_5$)—(CH$_2$)$_4$—OEt | 85.9 |
| A3-4 | 2,7-di-(n-propyl)octanedioic acid<br>HOOC—CH(C$_3$H$_7$)—(CH$_2$)$_4$—CH(C$_3$H$_7$)—(COOH)$_2$ | 2-n-propyl-6-ethoxyhexanoic acid<br>HOOC—CH(C$_3$H$_7$)—(CH$_2$)$_4$—OEt | 88.8 |
| A4-4 | 2,7-di-(n-butyl)octanedioic acid<br>HOOC—CH(C$_4$H$_9$)—(CH$_2$)$_4$—CH(C$_4$H$_9$)—COOH | 2-n-butyl-6-ethoxyhexanoic acid<br>HOOC—CH(C$_4$H$_9$)—(CH$_2$)$_4$—OEt | 90.9 |
| A4-1 | 2,4-di-(n-butyl)pentanedioic acid<br>HOOC—CH(C$_4$H$_9$)—CH$_2$—CH(C$_4$H$_9$)—COOH | 2-n-butyl-3-ethoxypropanoic acid<br>HOOC—CH(C$_4$H$_9$)—CH$_2$—OEt | 90.0 |
| A4-2 | 2,5-di-(n-butyl)hexanedioic acid<br>HOOC—CH(C$_4$H$_9$)—(CH$_2$)$_2$—CH(C$_4$H$_9$)—COOH | 2-n-butyl-4-ethoxybutanoic acid<br>HOOC—CH(C$_4$H$_9$)—(CH$_2$)$_2$—OEt | 91.2 |
| A4-6 | 2,9-di-(n-butyl)decanedioic acid<br>HOOC—CH(C$_4$H$_9$)—(CH$_2$)$_6$—CH(C$_4$H$_9$)—COOH | 2-n-butyl-8-ethoxyoctanoic acid<br>HOOC—CH(C$_4$H$_9$)—(CH$_2$)$_6$—OEt | 89.9 |
| A4-8 | 2,11-di-(n-butyl)dodecanedioic acid<br>HOOC—CH(C$_4$H$_9$)—(CH$_2$)$_8$—CH(C$_4$H$_9$)—COOH | 2-n-butyl-10-ethoxydecanoic acid<br>HOOC—CH(C$_4$H$_9$)—(CH$_2$)$_8$—OEt | 86.8 |
| A4-10 | 2,13-di-(n-butyl)tetradecanedioic acid<br>HOOC—CH(C$_4$H$_9$)—(CH$_2$)$_{10}$—CH(C$_4$H$_9$)—COOH | 2-n-butyl-12-ethoxydodecanoic acid<br>HOOC—CH(C$_4$H$_9$)—(CH$_2$)$_{10}$—OEt | 87.7 |

Example 2

Each of the Mixtures (III) (except A4-1) shown in Table 4 was taken out in an amount of 55 g and was dissolved in 495 g of ethylene glycol (concentration of the mixture was 10 wt %). Ammonia gas was blown to this solution at room temperature, and the blowing of ammonia gas was stopped when the pH of the solution reached about 7. The water content of this mixed solution was measured, and adjusted such that the water content was about 1%. Using the obtained solution containing the mixture as an electrolytic solution for operating an electrolytic capacitor, the pH, the water content (%), the electric conductivity and the sparking threshold voltage (Vsp) of this electrolytic solution were measured. This electrolytic solution was used for 1000 hours, and the changes with the passage of time regarding the pH, the water content (%) and the electric conductivity were measured. Table 5 shows the results. For the mixture A4-4, the sparking threshold voltage (Vsp) after 1000 hours was measured and found to be 420 V.

Comparative Example

Ethylene glycol solutions containing 10% by weight of each of suberic acid, 1,6-decane dicarboxylic acid and 5,6-decane dicarboxylic acid were prepared, and were used as electrolytic solutions. Regarding these electrolytic solutions, the changes with the passage of time were measured in the same manner as in Example 2. Table 5 shows the results.

TABLE 5

| Time (hrs) | Evaluation item | Example 2 | | | | | | | | | |
|---|---|---|---|---|---|---|---|---|---|---|---|
| | | A1-4 | | A2-4 | | A3-4 | | A4-2 | | A4-4 | |
| | | measured value | % | measured value | % | Measured value | % | measured value | % | measured value | % |
| Initial Stage 0 | PH | 8.97 | 100 | 8.32 | 100 | 8.46 | 100 | 9.13 | 100 | 9.06 | 100 |
| | Water content (%) | 1.47 | 100 | 1.18 | 100 | 1.32 | 100 | 1.28 | 100 | 1.01 | 100 |
| | mS/cm | 2.87 | 100 | 2.61 | 100 | 2.23 | 100 | 2.28 | 100 | 1.97 | 100 |
| | Vsp(V) | 390 | 100 | 365 | 100 | 380 | 100 | 385 | 100 | 405 | 100 |
| 100 | PH | 9.06 | 101 | 8.39 | 101 | 8.57 | 101 | 9.15 | 100 | 9.19 | 101 |
| | Water content (%) | 1.60 | 109 | 1.26 | 107 | 1.37 | 104 | 1.29 | 101 | 1.07 | 106 |
| | mS/cm | 2.73 | 95 | 2.51 | 96 | 2.17 | 97 | 2.24 | 98 | 1.86 | 94 |
| 250 | PH | 9.42 | 105 | 8.56 | 103 | 8.77 | 104 | 9.18 | 101 | 9.20 | 102 |
| | Water content (%) | 1.71 | 116 | 1.32 | 112 | 1.40 | 106 | 1.31 | 102 | 1.10 | 109 |
| | mS/cm | 2.68 | 93 | 2.47 | 95 | 2.16 | 97 | 2.19 | 96 | 1.85 | 94 |
| 500 | pH | 9.60 | 107 | 8.92 | 107 | 8.94 | 106 | 9.32 | 102 | 9.32 | 103 |
| | water content (%) | 1.84 | 125 | 1.43 | 121 | 1.47 | 111 | 1.31 | 102 | 1.18 | 117 |
| | mS/cm | 2.61 | 91 | 2.44 | 94 | 2.12 | 95 | 2.16 | 95 | 1.67 | 94 |
| 1,000 | pH | 9.87 | 110 | 9.07 | 109 | 8.94 | 106 | 9.50 | 104 | 9.36 | 103 |
| | water content (%) | 1.88 | 128 | 1.48 | 125 | 1.50 | 114 | 1.35 | 102 | 1.21 | 120 |
| | mS/cm | 2.58 | 90 | 2.41 | 92 | 2.09 | 94 | 2.10 | 92 | 1.67 | 94 |

| Time (hrs) | Example 2 | | | | | | Comparative Example | | | | | |
|---|---|---|---|---|---|---|---|---|---|---|---|---|
| | A4-6 | | A4-8 | | A4-10 | | suberic acid | | 1,6-D*[1] | | 5,6-D*[2] | |
| | Measured value | % | measured value | % | measured value | % | measured value | % | measured value | % | measured value | % |
| Initial Stage 0 | 8.38 | 100 | 7.63 | 100 | 8.65 | 100 | 7.39 | 100 | 8.08 | 100 | 7.03 | 100 |
| | 1.25 | 100 | 1.32 | 100 | 1.09 | 100 | 1.16 | 100 | 1.16 | 100 | 1.14 | 100 |
| | 1.93 | 100 | 1.90 | 100 | 1.83 | 100 | 2.74 | 100 | 2.12 | 100 | 2.70 | 100 |
| | 410 | 100 | 425 | 100 | 440 | 100 | 370 | 100 | 320 | 100 | 270 | 100 |
| 100 | 8.46 | 101 | 7.96 | 104 | 8.74 | 100 | 8.17 | 111 | 9.12 | 113 | 8.53 | 121 |
| | 1.30 | 104 | 1.43 | 108 | 1.14 | 105 | 2.11 | 182 | 1.58 | 136 | 1.64 | 144 |
| | 1.85 | 96 | 1.84 | 97 | 1.83 | 100 | 2.70 | 99 | 2.08 | 98 | 1.92 | 71 |
| 250 | 8.63 | 103 | 8.16 | 107 | 8.84 | 102 | 8.54 | 116 | 9.21 | 114 | 8.89 | 126 |
| | 1.38 | 110 | 1.48 | 112 | 1.18 | 108 | 2.30 | 198 | 1.71 | 147 | 1.84 | 161 |
| | 1.80 | 93 | 1.82 | 96 | 1.81 | 99 | 2.27 | 83 | 1.94 | 92 | 1.59 | 59 |
| 500 | 8.68 | 104 | 8.36 | 110 | 8.98 | 104 | 8.89 | 120 | 9.25 | 114 | 9.04 | 129 |
| | 1.44 | 115 | 1.52 | 115 | 1.26 | 116 | 9.02 | 122 | 1.81 | 156 | 1.92 | 168 |
| | 1.83 | 95 | 1.80 | 95 | 1.79 | 98 | 1.89 | 69 | 1.59 | 75 | 1.06 | 39 |
| 1,000 | 8.79 | 105 | 8.42 | 110 | 9.05 | 105 | 9.27 | 125 | 9.32 | 115 | 9.04 | 129 |
| | 1.44 | 115 | 1.54 | 117 | 1.31 | 120 | 2.90 | 100 | 1.94 | 167 | 1.92 | 168 |
| | 1.83 | 95 | 1.78 | 94 | 1.75 | 96 | 0.97 | 35 | 1.59 | 75 | 1.06 | 39 |

*[1]1,6-D: 1,6-decane dicarboxylic acid
*[2]5,6-D: 5,6-decane dicarboxylic acid

The percent in Table 5 shows an increase or a decrease for each period, taking the initial value as 100%. As shown in Table 5, in the suberic acid that does not have an alkyl group at a carbon atom of α position, the electric conductivity is significantly reduced at the time of 1000 hours, the pH is increased, and the water content was increased to about 2.5 times as much. This indicates that the electrical stability is very poor.

The electrical deterioration of the electrolytic solution containing 1,6-decane dicarboxylic acid was significantly larger than the electrolytic solution containing the mixture of the present invention, but was not so large as the electrical deterioration of the electrolytic solution containing suberic acid. This seems to be because structurally, 1,6-decane dicarboxylic acid has one butyl group at one of carbon atoms of α position of the carboxyl groups.

The electrical deterioration of the electrolytic solution containing 5,6-decane dicarboxylic acid was also significantly large. This seems to be because the dicarboxyl groups at the vicinal position can be easily anhydrated and esterified by ethylene glycol. Thus, although 5,6-decane dicarboxylic acid has a butyl group at each carbon atom of α position of both carboxyl groups, desired characteristics cannot be obtained.

The reduction in the electric conductivity of the mixture of the present invention containing dibasic acid having alkyl groups at each carbon atoms of α position of the carboxyl groups was small, and the variations in the pH and water content were also very small. This seems to be because the alkyl groups at each carbon atoms of α position significantly suppress not only anhydration of the carboxylic acid but also an esterification by the ethylene glycol in the capacitor. Furthermore, it seems that the alkyl groups at each carbon atoms of α position of the carboxylic acid prevent amidation by ammonia.

Example 3

Figure 2:
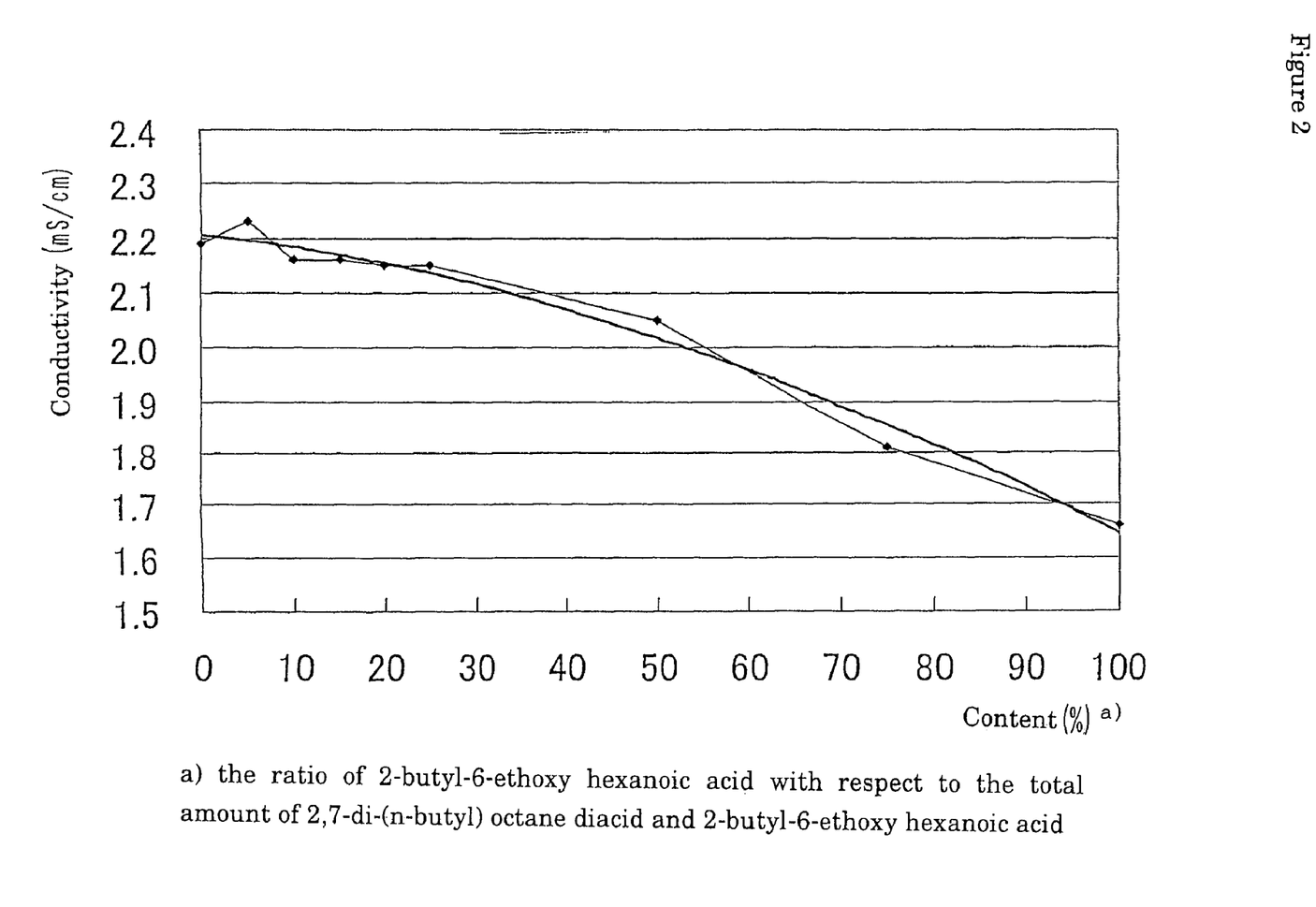
FIG. 2 is a graph showing the relationship between the composition of the electrolytic solution and the electric conductivity.

The electric characteristics were examined, with varied mixture ratios of 2,7-di-(n-butyl)octanedioic acid and 2-butyl-6-ethoxyhexanoic acid, which is a component compound A4-4 that was isolated in Example 1. FIG. 2 shows the relationship between the composition of an electrolytic solution and the electric conductivity. More specifically, FIG. 2 shows the relationship between the ratio (molar %) of 2-butyl-6-ethoxyhexanoic acid with respect to the total amount of 2,7-di-(n-butyl)octanedioic acid and 2-butyl-6-ethoxyhexanoic acid and the electric conductivity (mS/cm). Although the electric conductivity tends to be slightly reduced as 2-butyl-6-ethoxyhexanoic acid increases, the electric conductivity was relatively high and the sparking threshold voltage was high when 2-butyl-6-ethoxyhexanoic acid was contained in an amount of 30 molar % or less. The electric conductivity of the electrolytic solution containing only 2,7-di-(n-butyl) octanedioic acid was 2.19 mS/cm and the sparking threshold voltage thereof was 460V. The electric conductivity of the electrolytic solution containing only 2-butyl-6-ethoxyhexanoic acid was 1.66 mS/cm and the sparking threshold voltage thereof was 540V. These results indicate that it is necessary that in addition to the compound (1) (dibasic acid), the compound (2) is contained in the electrolytic solution of the present invention, because it significantly contributes to an increase in the sparking threshold voltage.

INDUSTRIAL APPLICABILITY

As described above, the electrolytic solution for operating an electrolytic capacitor using the compounds (1) and (2) as solutes has only a small electrical deterioration at a high voltage, and maintains good electrical characteristics for a long time. This electrolytic solution can be applied to a product with a rated voltage of 500 W, and has industrial and practical value.

The invention claimed is:

1. A composition for an electrolytic solution comprising a compound expressed by general formula (1) below and a compound expressed by general formula (2) below or their salts:

where each R is a same or different alkyl group, and R' is hydrogen, a methyl group or an ethyl group, and n is an integer of 0 to 14,
wherein the compound expressed by general formula (1) and the compound expressed by general formula (2) are contained in a mole ratio of 90:10 to 55:45.

2. The composition for an electrolytic solution according to claim 1, wherein R is a methyl group, and ethyl group, a propyl group or a butyl group, and n is 2 to 10.

3. An electrolytic solution for operating an electrolytic capacitor containing the composition for an electrolytic solution according to claim 1.

4. A process for producing a mixture comprising a compound expressed by general formula (1) below and a compound expressed by general formula (2) below or their salts:

where each R is a same or different alkyl group, and R' is hydrogen, a methyl group or an ethyl group, and n is an integer of 0 to 14, comprising:
(i) step of obtaining a diester of alkylated malonic acid by reacting a diester of malonic acid with alkylhalide in the presence of a base;
(ii) step of obtaining Mixture (I) containing a compound expressed by general formula (A1) below and a compound expressed by general formula (A2) below by reacting the diester of alkylated malonic acid with a dihaloalkane in the presence of a base:

where R and R'' is each independently an alkyl group, and R' is hydrogen, a methyl group or an ethyl group, and n is an integer of 0 to 14;
(iii) step of obtaining Mixture (II) containing a compound expressed by general formula (B1) below and a compound expressed by general formula (B2) below by subjecting Mixture (I) to saponification and acidolysis:

where each R is a same or different alkyl group, and R' is hydrogen, a methyl group or an ethyl group, and n is an integer of 0 to 14; and
(iv) step of collecting Mixture (III) containing the compound expressed by general formula (1) and the compound expressed by general formula (2) by subjecting Mixture (II) to decarbonation.

5. The process according to claim 4, wherein the base in each of step (i) and step (ii) is selected from the group consisting of pyridine, n-methyl pyrrolidine, metalalkoxide, potassium carbonate, and sodium carbonate.

6. The process according to claim 4, wherein R is a methyl group, an ethyl group, a propyl group or a butyl group, and n is 2 to 10.

7. An electrolytic solution for operating an electrolytic capacitor containing the composition for an electrolytic solution according to claim 2.

8. The process according to claim 5, wherein R is a methyl group, an ethyl group, a propyl group or a butyl group, and n is 2 to 10.

* * * * *